(12) United States Patent
Kaplan et al.

(10) Patent No.: US 9,335,999 B2
(45) Date of Patent: May 10, 2016

(54) ALLOCATING STORE QUEUE ENTRIES TO STORE INSTRUCTIONS FOR EARLY STORE-TO-LOAD FORWARDING

(71) Applicant: ADVANCED MICRO DEVICES, INC., Sunnyvale, CA (US)

(72) Inventors: David A Kaplan, Austin, TX (US); Daniel Hopper, Austin, TX (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 496 days.

(21) Appl. No.: 13/861,083

(22) Filed: Apr. 11, 2013

(65) Prior Publication Data
US 2014/0310506 A1    Oct. 16, 2014

(51) Int. Cl.
*G06F 9/30* (2006.01)
*G06F 9/38* (2006.01)

(52) U.S. Cl.
CPC .......... *G06F 9/30043* (2013.01); *G06F 9/3826* (2013.01); *G06F 9/3834* (2013.01); *G06F 9/3838* (2013.01)

(58) Field of Classification Search
None
See application file for complete search history.

(56) References Cited

U.S. PATENT DOCUMENTS

| 5,854,914 | A  | * | 12/1998 | Bodas  | G06F 9/3816 712/200 |
| 7,822,951 | B2 | * | 10/2010 | Ramani | G06F 9/3834 712/218 |
| 8,856,447 | B2 | * | 10/2014 | Williams, III | G06F 12/0862 711/122 |
| 2006/0179226 | A1 | * | 8/2006 | Guthrie | G06F 9/30043 711/125 |
| 2006/0271767 | A1 | * | 11/2006 | Osanai | G06F 9/30043 712/216 |
| 2008/0082721 | A1 | * | 4/2008 | Yu | G06F 12/0864 711/3 |
| 2008/0082793 | A1 | * | 4/2008 | Yu | G06F 9/3017 712/218 |
| 2010/0049952 | A1 | * | 2/2010 | Eddy | G06F 9/3834 712/223 |
| 2010/0205384 | A1 | * | 8/2010 | Beaumont-Smith | G06F 12/0862 711/154 |
| 2011/0040955 | A1 | * | 2/2011 | Hooker | G06F 9/30043 712/225 |
| 2011/0185158 | A1 | * | 7/2011 | Alexander | G06F 9/30043 712/204 |
| 2012/0059971 | A1 | * | 3/2012 | Kaplan | G06F 12/0897 711/3 |
| 2014/0013089 | A1 | * | 1/2014 | Henry | G06F 9/30076 712/226 |

(Continued)

FOREIGN PATENT DOCUMENTS

WO   WO 2013188705 A2 * 12/2013 .......... G06F 9/30043

OTHER PUBLICATIONS

'Cyclone: A Broadcast-Free Dynamic Instruction Scheduler with Selective Replay' by Dan Ernst et al., Proceedings of the 30th Annual International Symposium on Computer Architecture (ISCA'03), 2003 IEEE.*

(Continued)

*Primary Examiner* — Steven Snyder

(57) ABSTRACT

The present invention provides a method and apparatus for allocating store queue entries to store instructions for early store-to-load forwarding. Some embodiments of the method include allocating an entry in a store queue to a store instruction in response to the store instruction being dispatched and prior to receiving a translation of a virtual address to a physical address associated with the store instruction. The entry includes storage for data to be written to the physical address by the store instruction.

23 Claims, 5 Drawing Sheets

(56) References Cited

U.S. PATENT DOCUMENTS

| | | | | |
|---|---|---|---|---|
| 2014/0089589 A1* | 3/2014 | Meier | ................. | G06F 9/30087 711/125 |
| 2014/0122847 A1* | 5/2014 | Henry | ................. | G06F 9/30076 712/243 |
| 2014/0181482 A1* | 6/2014 | Smaus | ................. | G06F 9/30043 712/225 |
| 2014/0244984 A1* | 8/2014 | Kaplan | ............... | G06F 9/30043 712/225 |
| 2014/0380023 A1* | 12/2014 | Smaus | ................. | G06F 9/3826 712/216 |
| 2015/0121010 A1* | 4/2015 | Kaplan | ............... | G06F 12/0875 711/125 |
| 2015/0205605 A1* | 7/2015 | Abdallah | ............ | G06F 9/30043 711/145 |

OTHER PUBLICATIONS

'Using Virtual Load/Store Queues (VLSQs) to Reduce the Negative Effects of Reordered Memory Instructions' by Aamer Jaleel and Bruce Jacob, Proceedings of the 11th Int'l Symposium on High-Performance Computer Architecture (HPCA-11 2005), 2005 IEEE.*

'Implementing Optimizations at Decode Time' by Ilhyun Kim et al., Proceedings of the 29th Annual International Symposium on Computer Architecture (ISCA.02), 2002 IEEE.*

'CS252 Graduate Computer Architecture Lecture 9 Instruction Level Parallelism: Reality Sets in' by John Kubiatowicz, Feb. 21, 2007.*

'Streamlining Inter-operation Memory Communication via Data Dependence Prediction' by Andreas Moshovos et al., copyright 1997 IEEE, Published in the Proceedings of Micro-30, Dec. 1-3, 1997.*

'Late-Binding: Enabling Unordered Load-Store Queues' by Simha Sethumadhavan et al., the International Symposium on Computer Architecture 2007.*

'Improving Processor Efficiency by Exploiting Common-Case Behaviors of Memory Instructions' a Thesis by Samantika Subramaniam, Georgia Institute of Technology, May 2009.*

'PTLsim: A Cycle Accurate Full System x86-64 Microarchitectural Simulator' by Matt T. Yourst, copyright 2007 IEEE.*

* cited by examiner

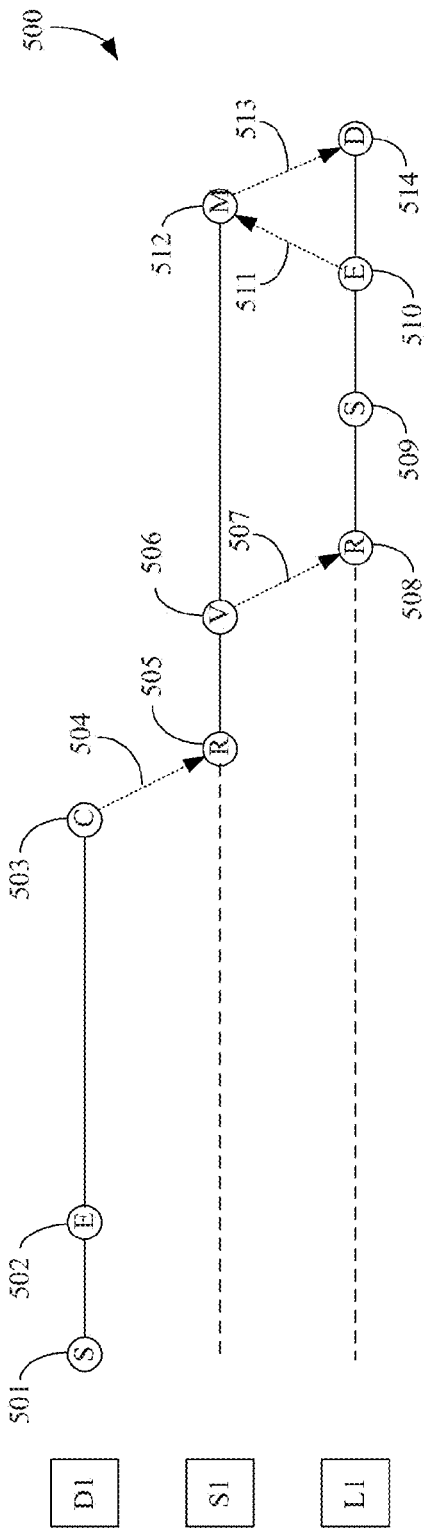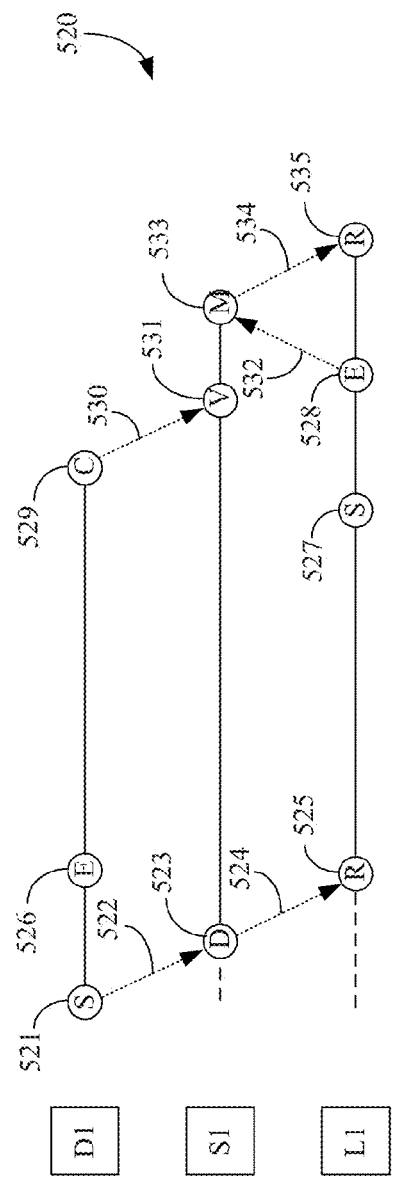

ALLOCATING STORE QUEUE ENTRIES TO STORE INSTRUCTIONS FOR EARLY STORE-TO-LOAD FORWARDING

BACKGROUND

This application relates generally to processing systems, and, more particularly, to allocation of store queue entries in processing systems.

Processing systems utilize two basic memory access instructions: a store instruction that writes information from a register to a memory location and a load instruction that reads information out of a memory location and loads the information into a register. High-performance out-of-order execution microprocessors can execute load and store instructions out of program order. For example, a program code may include a series of memory access instructions including load instructions (L1, L2, . . . ) and store instructions (S1, S2, . . . ) that are to be executed in the order: S1, L1, S2, L2, . . . However, the out-of-order processor may select the instructions in a different order such as L1, L2, S1, S2, . . . Some instruction set architectures (e.g. the x86 instruction set architecture) require strong ordering of memory operations. Generally, memory operations are strongly ordered if they appear to have occurred in the program order specified. When attempting to execute instructions out of order, the processor must respect true dependencies between instructions because executing load instructions and store instructions out of order can produce incorrect results if a dependent load/store pair was executed out of order. For example, if (older) S1 stores data to the same physical address that (younger) L1 subsequently reads data from, the store S1 must be completed (or retired) before L1 is performed so that the correct data is stored at the physical address for L1 to read.

Store and load instructions typically operate on memory locations in one or more caches associated with the processor. Values from store instructions are not committed to the memory system (e.g., the caches) immediately after execution of the store instruction. Instead, the store instructions, including the memory address and store data, are buffered in a store queue so they can be written in-order. Eventually, the store commits and the buffered data is written to the memory system. Buffering store instructions can be used to help reorder store instructions so that they can commit in order. However, buffering store instructions can introduce other complications. For example, a load instruction can read an old, out-of-date value from a memory address if a store instruction executes and buffers data for the same memory address in the store queue and the load attempts to read the memory value before the store instruction has retired.

A technique called store-to-load forwarding can provide data directly from the store queue to a requesting load. For example, the store queue can forward data from completed but not-yet-committed ("in-flight") store instructions to later (younger) load instructions. The store queue in this case functions as a Content-Addressable Memory (CAM) that can be searched using the memory address instead of a simple FIFO queue. When store-to-load forwarding is implemented, each load instruction searches the store queue for in-flight store instructions to the same address. The load instruction can obtain the requested data value from a matching store instruction that is logically earlier in program order (i.e. older). If there is no matching store instruction, the load instruction can access the memory system to obtain the requested value as long as any preceding matching store instructions have been retired and have committed their values to the memory.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Conventional store queues wait until a store instruction becomes eligible to execute before allocating a store entry that can hold the data to be written by the store instruction. For example, the store instructions may be allocated entries in a queue upon dispatch, but this queue may not include storage for the data that will be written by the store instruction. The store instruction may therefore be subsequently allocated an entry in a store queue that includes storage for the data after the store instruction receives a physical address for the storage location, e.g., from a translation lookaside buffer. The conventional store queue allocation policy results in a smaller store queue, and reduced die area, because fewer store instructions need to be allocated entries in the store queue at any particular time.

However, the conventional store queue allocation policy may also result in delays that can degrade performance of the system. For example, a store instruction may need to wait until it is eligible to execute, is allocated a store entry that can hold data, and receives the data before performing store-to-load forwarding (STLF) to a load instruction with a matching address. Once the store entry has been allocated, the store instruction may be eligible to perform STLF of the received data to the matching load instruction. For another example, STLF may be delayed if a store instruction is waiting for the results of another operation, i.e., the store instruction is dependent upon another operation. The store instruction waits until the operation has completed and, once the operation has completed and the store instruction has received the results, the store instruction sends a wake-up signal to the load instruction so that STLF may be performed from the store instruction to the load instruction.

The disclosed subject matter is directed to addressing the effects of one or more of the problems set forth above.

In some embodiments, a method is provided for allocating store queue entries to store instructions for early store-to-load forwarding. Some embodiments of the method include allocating an entry in a store queue to a store instruction in response to the store instruction being dispatched and prior to receiving a translation of a virtual address to a physical address associated with the store instruction. The entry includes storage for data to be written to the physical address by the store instruction.

In some embodiments, an apparatus is provided for allocating store queue entries to store instructions for early store-to-load forwarding. Some embodiments of the apparatus include a store queue that includes entries for storing information associated with a store instruction. The entries include storage for data to be written to a physical address by the store instruction. Entries are allocated in response to the store instruction being dispatched and prior to receiving a translation of a virtual address associated with the store instruction to the physical address.

In some embodiments, a computer readable media including instructions that when executed can configure a manufacturing process used to manufacture a semiconductor device for allocating store queue entries to store instructions for early store-to-load forwarding. Some embodiments of the semiconductor device include a store queue that includes entries for storing information associated with a store instruction. The entries include storage for data to be written to a physical address by the store instruction. Entries are allocated in response to the store instruction being dispatched and prior to receiving a translation of a virtual address associated with the store instruction to the physical address.

BRIEF DESCRIPTION OF THE DRAWINGS

The disclosed subject matter may be understood by reference to the following description taken in conjunction with the accompanying drawings, in which like reference numerals identify like elements, and in which:

FIG. 5A shows a timing diagram for a conventional store-to-load forwarding (STLF) of data generated by an operation and provided to a store instruction and subsequently forwarded to a load instruction; and FIG. 5B shows a timing diagram for STLF of data generated by an operation and provided to a store instruction and subsequently forwarded to a load instruction, according to some embodiments.

Figure 1:
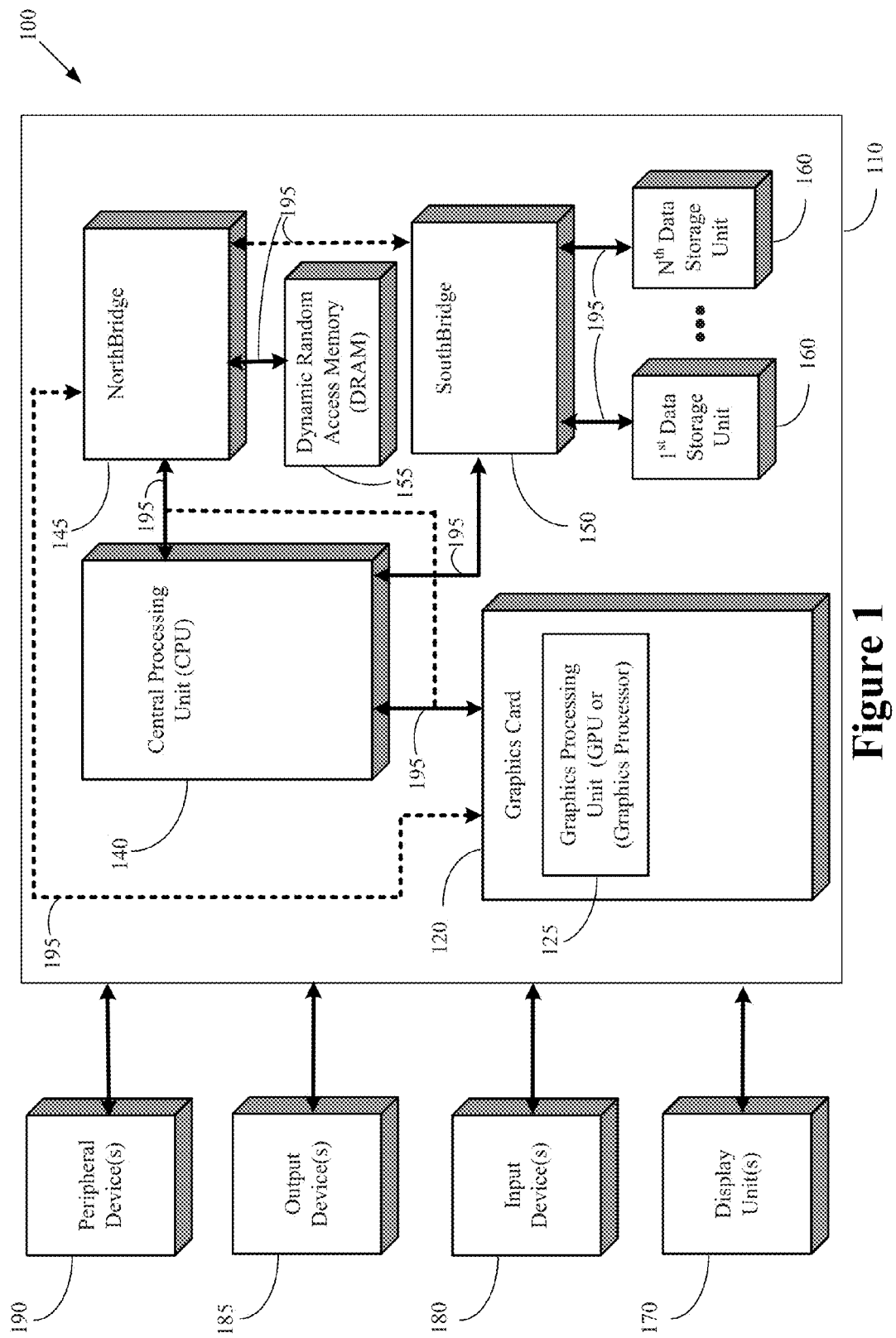
FIG. 1 conceptually illustrates a computer system, according to some embodiments.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It should be appreciated that in the development of any such actual embodiment, numerous implementation-specific decisions should be made, which may vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, conventional store queue allocation policy can lead to substantial delays in reforming operations such as STLF. The present application therefore describes embodiments of store queue allocation policies that allow entries in the store queue to be allocated to store instructions upon dispatch of the store instruction. Store instructions may therefore be allocated entries before the store instruction receives a virtual-to-physical address translation and becomes eligible to execute. Store instructions in the store queue can hold data as soon as the entry is allocated to the store instruction. The store instructions may therefore be eligible to perform STLF as soon as data becomes available, e.g. predetermined data, data snooped from result buses, or results of other operations. Some embodiments of the store queue may also record information indicating a source of the information that is to be held in the entry of the store queue and written by the store instruction. If one or more store instructions in the store queue are dependent on other operations, the store instruction(s) may also send a wake-up signal to a matching load instruction in response to the other operation(s) being scheduled for execution because this indicates to the store instruction that the data will be available for forwarding within a predetermined or estimated time period. Timing of the wake-up signal and the load instruction may be coordinated so that the matching store instruction receives information from the dependent operation by the time the load instruction requires the data from the store instruction.

FIG. 1 conceptually illustrates a computer system 100, according to some embodiments. The computer system 100 may be a personal computer, a laptop computer, a handheld computer, a netbook computer, a mobile device, a tablet computer, a netbook, an ultrabook, a telephone, a personal data assistant (PDA), a server, a mainframe, a work terminal, a smart television, or the like. The computer system includes a main structure 110 which may be a computer motherboard, system-on-a-chip, circuit board or printed circuit board, a desktop computer enclosure or tower, a laptop computer base, a server enclosure, part of a mobile device, tablet, personal data assistant (PDA), or the like. The computer system 100 may run an operating system such as Linux®, Unix®, Windows®, Mac OS®, or the like.

In some embodiments, the main structure 110 includes a graphics card 120. For example, the graphics card 120 may be an ATI Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic or communicative connection. The graphics card 120 may include a graphics processing unit (GPU) 125 used in processing graphics data. The graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. In some embodiments, the graphics card 120 may be coupled to the CPU 140 via the northbridge 145 or some other electronic or communicative connection. For example, CPU 140, northbridge 145, GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art; the type of system RAM 155 may be a matter of design choice. The northbridge 145 may be connected to a southbridge 150. The northbridge 145 and southbridge 150 may be on the same chip in the computer system 100, or the northbridge 145 and southbridge 150 may be on different chips. The southbridge 150 may be connected to one or more data storage units 160. The data storage units 160 may be hard drives, solid state drives, magnetic tape, or any other non-transitory, writable media used for storing data. In various embodiments, the CPU 140, northbridge 145, southbridge 150, GPU 125, or system RAM 155 may be a computer chip or a silicon-based computer chip, or may be part of a computer chip or a silicon-based computer chip. The various components of the computer system 100 may be operatively, electrically, or physically connected or linked with a bus 195 or more than one bus 195. Some embodiments of the buses 195 may be result buses that are used to convey results of operations performed by one functional entity in the computer system 100 to another functional entity in the computer system 100.

The computer system 100 may be connected to one or more display units 170, input devices 180, output devices 185, or peripheral devices 190. These elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The GPU 125 and the CPU 140 may implement various functional entities including one or more processor cores, floating-point units, arithmetic logic units, load store units, translation lookaside buffers, instruction pickers, or caches such as L1, L2, or L3 level caches in a cache hierarchy.

Figure 2:
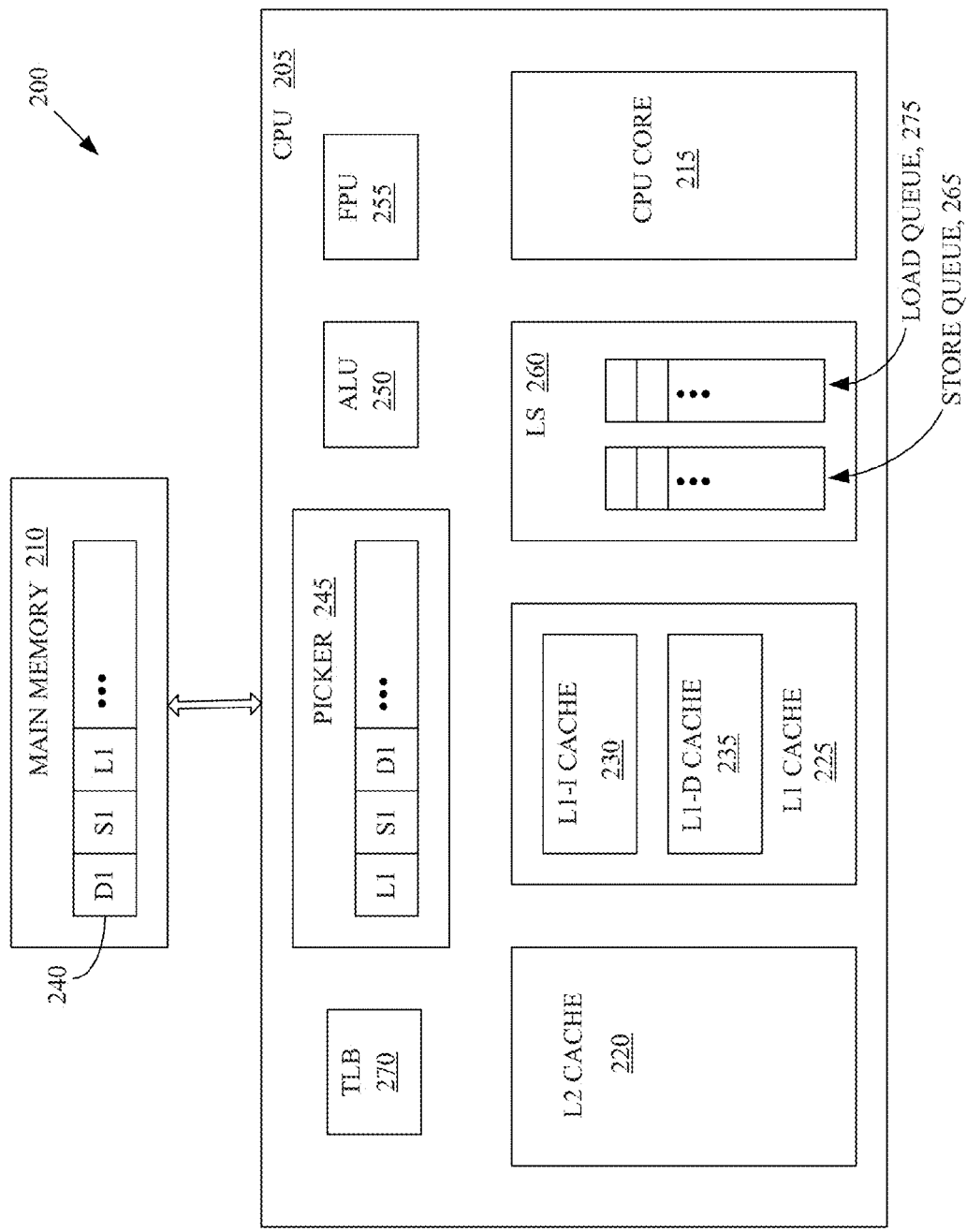
FIG. 2 conceptually illustrates an example of a semiconductor device that may be formed in or on a semiconductor wafer (or die), according to some embodiments.

FIG. 2 conceptually illustrates an example of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarizing, polishing, annealing, and the like. Some embodiments of the device 200 include a central processing unit (CPU) 205 that is configured to access instructions or data that are stored in the main memory 210. Some embodiments of the CPU 205 may be implemented as part of the CPU 140 shown in FIG. 1, the GPU 125 shown in FIG. 1, or other processing elements.

The CPU 205 includes a CPU core 215 that is used to execute the instructions or manipulate data. The CPU 205 also implements a hierarchical (or multilevel) cache system that is used to speed access to the instructions or data by storing selected instructions or data in the caches. However, persons of ordinary skill in the art having benefit of the present disclosure should appreciate that some embodiments of the device 200 may implement different configurations of the CPU 205, such as configurations that use external caches. Some embodiments may implement different types of processors such as graphics processing units (GPUs) or accelerated processing units (APUs) and some embodiments may be implemented in processing devices that include multiple processing units or processor cores.

The cache system shown in FIG. 2 includes a level 2 (L2) cache 220 for storing copies of instructions or data that are stored in the main memory 210. Relative to the main memory 210, the L2 cache 220 may be implemented using faster memory elements and may have lower latency. The cache system shown in FIG. 2 also includes an L1 cache 225 for storing copies of instructions or data that are stored in the main memory 210 or the L2 cache 220. Relative to the L2 cache 220, the L1 cache 225 may be implemented using faster memory elements so that information stored in the lines of the L1 cache 225 can be retrieved quickly by the CPU 205. Some embodiments of the L1 cache 225 are separated into different level 1 (L1) caches for storing instructions and data, which are referred to as the L1-I cache 230 and the L1-D cache 235. Persons of ordinary skill in the art having benefit of the present disclosure should appreciate that the cache system shown in FIG. 2 is one example of a multi-level hierarchical cache memory system and some embodiments may use different multilevel caches including elements such as L0 caches, L1 caches, L2 caches, L3 caches, and the like.

The CPU core 215 can execute programs that are formed using instructions such as load instructions and store instructions. Some embodiments of programs are stored in the main memory 210 and the instructions are kept in program order, which indicates the logical order for execution of the instructions so that the program operates correctly. For example, the main memory 210 may store instructions for a program 240 that includes the store S1, the load L1, and another instruction D1 that may provide data to the store S1 in program order. Instructions that occur earlier in program order are referred to as "older" instructions and instructions that occur later in program order are referred to as "younger" instructions. Persons of ordinary skill in the art having benefit of the present disclosure should appreciate that the program 240 may also include other instructions that may be performed earlier or later in the program order of the program 240.

Some embodiments of the CPU 205 are out-of-order processors that can execute instructions in an order that differs from the program order of the instructions in the program 240. The instructions may therefore be decoded and dispatched in program order and then issued out-of-order. As used herein, the term "dispatch" refers to sending a decoded instruction to the appropriate unit for execution and the term "issue" refers to executing the instruction. The CPU 205 includes a picker 245 that is used to pick instructions for the program 240 to be executed by the CPU core 215. For example, the picker 245 may select instructions from the program 240 in the order L1, S1, D1, which differs from the program order of the program 240 because the younger load L1 is picked before the older store S1, which is picked before the older instruction D1.

Some embodiments of the CPU 205 implement an arithmetic logic unit (ALU) 250 that is used to perform arithmetic or logical operations. For example, the ALU 250 may receive input from one or more registers in the CPU 140 and may be controlled to perform one or more arithmetic or logical operations on the input and then write the results to one or more output registers in the CPU 240. Some embodiments of the ALU 250 may be used to perform operations indicated by instructions (such as the instruction D1) and the results may be provided to a store instruction (such as the store instruction S1) for subsequent writing to one or more of the caches 220, 225, 230, 235. Some embodiments of the CPU 205 may implement a floating-point unit (FPU) 255 perform operations such as addition, subtraction, multiplication, division, and square root, or transcendental functions on floating point numbers. Some embodiments of the ALU 250 may be used to perform operations indicated by instructions (such as the instruction D1) and the results may be provided to a store instruction (such as the store instruction S1) for subsequent writing to one or more of the caches 220, 225, 230, 235. Some embodiments of the CPU 205 may include buses (such as the buses 195 shown in FIG. 1) for conveying results of operations between entities within the CPU 205.

The CPU 205 implements a load-store unit (LS 260) that includes one or more store queues 265 that are used to hold the store instructions and associated data. The data location for each store instruction is indicated by a virtual address, which may be translated into a physical address so that data can be accessed from the main memory 210 or one of the caches 220, 225, 230, 235. The CPU 205 may therefore include a translation look aside buffer (TLB) 270 that is used to translate virtual addresses into physical addresses. The store instruction may be placed in the store queue 265 to wait for data upon dispatch. Entries in the store queue 265 may therefore be allocated prior to the store instruction (such as S1) receiving a valid address translation from the TLB 270 or becoming eligible for execution. Entries in the store queue 265 include storage space for the data that is to be written to the physical address by the corresponding store instruction. Consequently, entries corresponding to the store instruction are able to receive data upon dispatch and prior to receiving an address translation.

Figure 3:
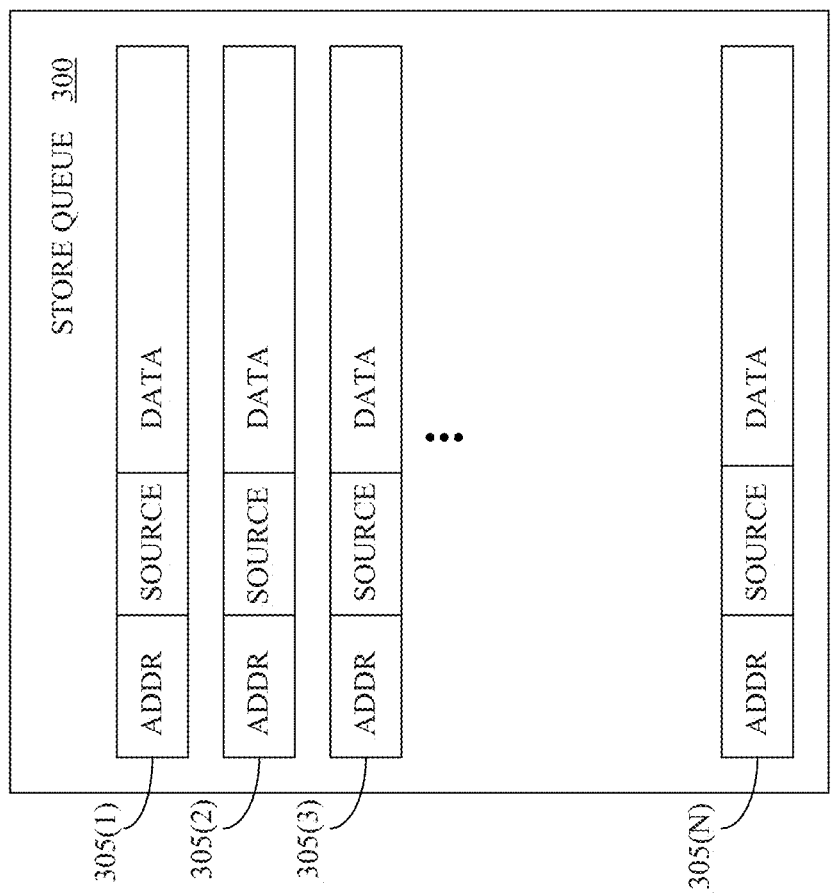
FIG. 3 conceptually illustrates one example of a store queue such as the store queue shown in FIG. 2, according to some embodiments.

FIG. 3 conceptually illustrates one example of a store queue 300 such as the store queue 265 shown in FIG. 2, according to some embodiments. The store queue 300 is configured to store entries 305 associated with store instructions. The entries 305 include an address field (ADDR) that includes information indicating an address of a location for storing data associated with the store instruction, such as a virtual address or, if the store instruction has received an address translation, a physical address in a memory page. The entries 305 also include space for holding data (DATA) that is to be written to the address indicated in the address field upon execution of the corresponding store instruction. Although the DATA space is allocated to each entry 305 when the entry is allocated to a store instruction, data may not be initially stored in the DATA space. For example, the store instruction may be awaiting data from an in-flight operation, as discussed herein.

Some embodiments of the entry 305 in the store queue 300 are configured to store information indicating the source (SOURCE) of the data that is going to be written to the address indicated in the address field. For example, the source of the data may be a fixed or predetermined value (like 0) or the data may be provided by a register file or an in-flight operation. Since the entry 305 includes space for holding the data, the data may be written into the entry as soon as it is available. For example, fixed values may be entered into the DATA field immediately upon allocation of the entry 305. Some embodiments of the store queue 300 may have one or more connections to one or more register files so that entries 305 can access the data in the register files and write this information into the DATA field as soon as the data is available in the register file. Data generated by an in-flight operation may be written to the DATA field when execution of the in-flight operation completes. For example, the store queue 300 may snoop result buses and obtain data when it sees an operation complete and assert the result on the result bus. Some embodiments of the store queue 300 may use the same storage elements for the SOURCE and DATA fields. For example, storage elements associated with the DATA field may store information indicating where the data is coming from (e.g., SOURCE information) and this information may be replaced with the actual data when the data arrives.

Some embodiments of the entries 305 may be configured to store information that indicates the relative age of the entries 305. For example, the relative age of the entry 305 may be indicated by a pointer that points to the next youngest or oldest entry 305, timestamps or counters that indicate the relative ages of the entries 305, or by storing the entries 305 in an order that indicates their relative ages.

Referring back to FIG. 2, one or more load queues 275 are implemented in the load-store unit 260 shown in FIG. 2. Load data may be indicated by virtual addresses and so the virtual addresses for load data may be translated into a physical address by the TLB 270. A load instruction (such as L1) may be added to the load queue 275 on dispatch or when the load instruction is picked and receives a valid address translation from the TLB 270. Either the virtual or physical address of the load instruction may be used to check the store queue 265 for address matches. If an address (virtual or physical depending on the embodiment) in the store queue 265 matches the address of the data used by the load instruction, then store-to-load forwarding may be used to forward the data from the store queue 265 to the load instruction in the load queue 275.

Entries in the store queue 265 may be eligible to initiate STLF as soon as they have been allocated to a store instruction and received an address, even though the corresponding store instruction may not have received the data that is to be forwarded. For example, the load store unit 260 may use indications that a source of the data is in the process of generating the data for the entry in the store queue 265 and timing information associated with the source, the store queue 265, or the load queue 275 to provide a wake-up signal from the store queue 265 to the load queue 275. For example, the results of an operation (such as the instruction D1) performed by the ALU 250 or the FPU 255 may be provided to an entry in the store queue 265 (e.g., an entry corresponding to the store instruction S1) and subsequently forwarded to an entry in the load queue 275 such as an entry corresponding to the load instruction L1. A wake-up signal may therefore be provided from the store queue 265 to the load queue 275 in response to the operation being scheduled for execution. The load queue 275 may use the wake-up signal to schedule execution of the load instruction. Scheduling of the load instruction may be timed so that the data is available for forwarding from the store queue 265 when needed by the load instruction. Some embodiments of the system may include separate buses for carrying the result data and scheduling information between the ALU 250, the FPU 255, the store queue 265, and the load queue 275.

Figure 4:
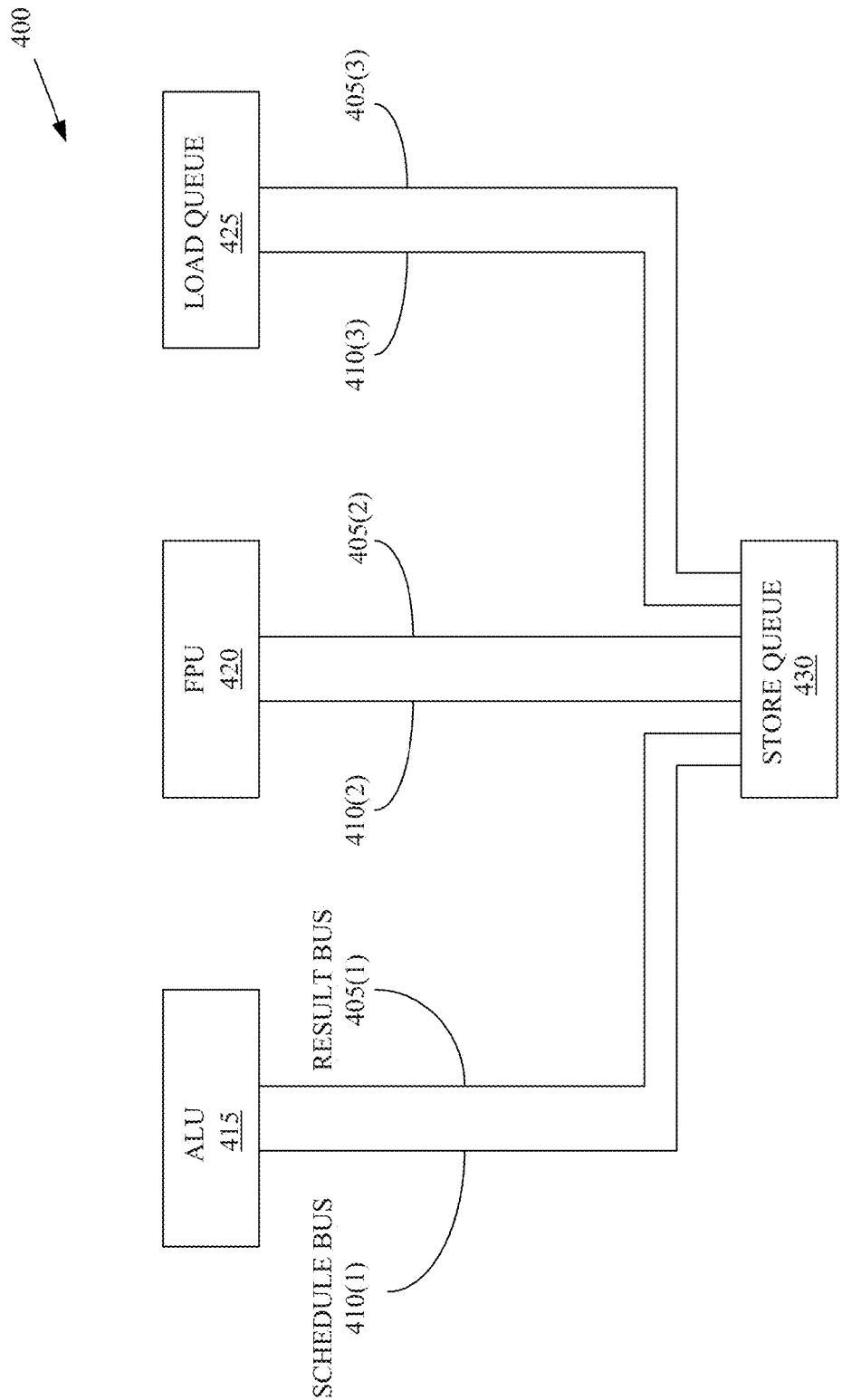
FIG. 4 conceptually illustrates an example of a computer system that includes result buses and scheduling buses, according to some embodiments.

FIG. 4 conceptually illustrates an example of a computer system 400 that includes result buses 405 and scheduling buses 410, according to some embodiments. The result buses 405 and the scheduling buses 410 shown in FIG. 4 may be used to convey result data or scheduling information, respectively, between elements in the computer system 400 such as an ALU 415, an FPU 420, a store queue 425, or a load queue 430. Embodiments of the ALU 415, the FPU 420, the store queue 425, or the load queue 430 may be implemented in some embodiments of the device 200 depicted in FIG. 2. The store queue 425 can monitor the schedule buses 410 to determine when operations associated with store instructions in the store queue 425 have been scheduled for operation. The store queue 425 can then initiate the wake-up process for STLF in response to detecting a signal indicating that an associated operation has been scheduled. For example, the ALU 415 or the FPU 420 may provide a signal to the schedule buses 410(1-2) in response to scheduling execution of operations. For another example, the load queue 425 may provide a signal to the schedule bus 410(3) when a load instruction is scheduled to be executed.

The store queue 425 may detect signals on one of the schedule buses 410 and may provide a wake-up signal to the load queue 430 if the signal on one or more of the schedule buses 410 indicates scheduling of an operation or load instruction that provides results that are used by a store instruction that is eligible for STLF. The load queue 430 may receive the wake-up signal and respond to the wake-up signal by scheduling execution of the load instruction, as discussed herein. Once the operation or instruction has completed execution, the ALU 415, FPU 420, or load queue 425 can provide results of the operation to the result buses 405. The store queue 425 may read the results from the result buses 405 and store them in the corresponding entry. Data from the entry in the store queue 425 may then be forwarded to the load queue 430 using STLF.

FIG. 5A shows a timing diagram 500 for conventional STLF of data generated by an operation D1 and provided to a store instruction S1 and subsequently forwarded to a load instruction L1. Time increases from left to right along the horizontal axis. Units of time are arbitrary and the intervals illustrated in FIG. 5A are intended to be illustrative. The store instruction S1 is used to store the results of the operation D1 and so the store instruction S1 is dependent upon the operation D1. The operation D1 is scheduled (S) for execution at 501 and is later executed (E) at 502. Execution of the operation D1 completes at 503 and then the results of the operation are written (at 504) to a data storage portion of an entry in a store queue corresponding to the store instruction S1. The store queue receives (R) the data at 505 and subsequently marks (at 506) the entry corresponding to the store instruction S1 as having valid data (V). A wake-up signal may then be sent (at 507) from the store queue to the load queue, which receives (R) the wake-up signal at 508. The load queue schedules (S) the corresponding load instruction for execution at 509 and the load instruction begins to execute (E) at 510.

An address (either virtual or physical depending on the embodiment) of the information to be loaded by the load instruction L1 matches an address (either virtual or physical depending on the embodiment) of data to be written by the store instruction S1 and so the load instruction L1 requests (at 511) forwarding of the data from the store instruction to the load instruction L1. The store instruction S1 has valid data and so this data is multiplexed (M) out of the entry in the store queue (at 512) and forwarded (at 513) to the load instruction L1, which receives (R) the data at 514. The load instruction L1 may then complete execution by loading the data into a corresponding register. Thus, the time required to forward the data produced by the operation D1 to the load instruction L1 may be determined by the time that elapses between scheduling of the operation D1 at 501 and reception of the data at 514.

FIG. 5B shows a timing diagram 520 for STLF of data generated by an operation D1 and provided to a store instruction S1 and subsequently forwarded to a load instruction L1, according to some embodiments. Time increases from left to right along the horizontal axis. Units of time are arbitrary and the intervals illustrated in FIG. 4B are intended to be illustrative. The store instruction S1 is used to store the results of the operation D1 and so the store instruction S1 is dependent upon the operation D1. The operation D1 is scheduled (S) for execution at 521. A signal indicating that the operation D1 has been scheduled (at 521) may then be transmitted at 522. Persons of ordinary skill in the art having benefit of the present disclosure should appreciate that some embodiments may transmit the signal in response to other events such as the operation D1 beginning execution. The store queue may be configured to detect (D) the signal at 523 so that the store queue is aware that the operation D1 has been scheduled for execution. An entry in the store queue has been allocated to the store instruction S1 and the entry may therefore be eligible to indicate its availability for STLF upon allocation. For example, the entry may be allocated prior to the store instruction S1 receiving a virtual-to-physical address translation, as discussed herein. The store queue may therefore transmit (at 524) a wake-up signal to the load queue, which receives (R) the signal at 525.

The operation D1 begins execution (E) at 526. Some embodiments may perform some or all of the steps 522, 523, 524, 525 concurrently with execution of the operation D1. Execution (E) of the operation D1 may therefore begin (at 526) at the same time as or prior to some or all of the steps 522, 523, 524, 525. The load queue schedules (S) the load instruction L1 at 527 for execution (E) at 528. Scheduling of the load instruction L1 may be performed concurrently with execution of the operation D1 and may, therefore, be performed prior to completion (C) of the operation D1 at 529. Once the operation D1 completes (at 529), the results of the operation may be transmitted (at 530) to the store queue, which may write the results to the corresponding entry and mark the entry as valid (V) at 531.

An address (either virtual or physical depending on the embodiment) of the information to be loaded by the load instruction L1 matches an address (either virtual or physical depending on the embodiment) of data to be written by the store instruction S1 and so the load instruction L1 requests (at 532) forwarding of the data from the store instruction S1 to the load instruction L1. Scheduling of the load instruction L1 may be coordinated with execution of the operation D1 and the store instruction S1 (e.g., by incorporating appropriate delays at various points in the timing diagram 520) so that the data is available in the store queue entry corresponding to the store instruction S1 before it is requested by the load instruction L1. Consequently, the store instruction S1 has valid data and this data may be multiplexed (M) out of the entry in the store queue (at 533) and forwarded (at 534) to the load instruction L1, which receives (R) the data at 535.

The load instruction L1 may complete execution by loading the data into a corresponding register. Thus, the time required to forward the data produced by the operation D1 to the load instruction L1 may be determined by the time that elapses between scheduling of the operation D1 at 521 and reception of the data at 535. The elapsed time is significantly shorter than the elapsed time in the conventional process illustrated in FIG. 5A. In the event that the load instruction does not receive the forwarded data (at 535), e.g. due to failure of the operation D1 or the store instruction Si, execution of the load instruction may be canceled or replayed at a later time.

Embodiments of processor systems that can allocate a store queue entries to store instructions for early STLF as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    allocating an entry in a store queue to a store instruction in response to the store instruction being dispatched and prior to receiving a translation of a virtual address to a physical address associated with the store instruction, wherein the entry comprises storage for data to be written to the physical address by the store instruction; and
    in response to identifying that a load instruction in a load queue is associated with the store instruction, sending a wake-up signal from the store queue to the load queue to wake-up the load instruction, wherein the sending comprises sending the wake-up signal after allocating the entry in the store queue and prior to the entry receiving the data.

2. The method of claim 1, wherein allocating the entry prior to receiving the translation comprises allocating the entry in the store queue to the store instruction prior to the store instruction becoming eligible to execute.

3. The method of claim 1, wherein allocating the entry comprises storing information indicating a source of the data to be written to the physical address by the store instruction.

4. The method of claim 3, wherein the source of the data to be written to the physical address by the store instruction comprises at least one of a predetermined value, a register file entry, or an in-flight operation.

5. The method of claim 1, wherein identifying that the load instruction is associated with the store instruction comprises determining that an address associated with the store instruction matches an address associated with the load instruction in the load queue.

6. The method of claim 5, wherein sending the wake-up signal comprises sending the wake-up signal in response to determining that an operation for providing the data to the entry in the store queue is scheduled for execution.

7. The method of claim 6, wherein sending the wake-up signal comprises sending the wake-up signal concurrently with execution of the operation for providing the data to the entry.

8. The method of claim 6, comprising scheduling the load instruction for execution concurrently with execution of the operation for providing the data to the entry.

9. The method of claim 6, comprising replaying the load instruction if the entry in the store queue has not received the data before the load instruction executes.

10. The method of claim 5, wherein determining that the address associated with the store instruction matches the address associated with the load instruction comprises determining, prior to translation of the virtual address of the store instruction to a physical address, that the virtual address associated with the store instruction matches a virtual address associated with the load instruction.

11. An apparatus, comprising:
a load queue configured to store a load instruction;
a store queue comprising entries for storing information associated with a store instruction, wherein the entries comprise storage for data to be written to a physical address by the store instruction, and wherein the entries are allocated in response to the store instruction being dispatched and prior to receiving a translation of a virtual address associated with the store instruction to the physical address; and
wherein the store queue is configured to, in response to an identification that the load instruction is associated with the store instruction, send a wake-up signal from the store queue to the load queue to wake-up the load instruction, wherein the store queue is configured to send the wake-up signal after allocating the entry in the store queue and prior to the entry receiving the data.

12. The apparatus of claim 11, wherein the store queue is configurable to allocate entries prior to the store instruction becoming eligible to execute.

13. The apparatus of claim 11, wherein the apparatus is configurable to store information indicating a source of the data to be written to the physical address by the store instruction.

14. The apparatus of claim 13, wherein the source of the data to be written to the physical address by the store instruction comprises at least one of a predetermined value, a register file entry, or an in-flight operation.

15. The apparatus of claim 11, further comprising a load store unit comprising the store queue and the load queue, and wherein the load store unit is configurable to identify that the load instruction is associated with the store instruction by determining that an address associated with the store instruction matches an address associated with the load instruction.

16. The apparatus of claim 15, wherein the store queue is configurable to send the wake-up signal in response to determining that an operation for providing the data to the entry in the store queue is scheduled for execution.

17. The apparatus of claim 16, further comprising a bus, wherein the store queue is configurable to detect signals on the bus indicating that the operation is scheduled for execution.

18. The apparatus of claim 16, wherein the store queue is configurable to send the wake-up signal concurrently with execution of the operation for providing the data to the entry.

19. The apparatus of claim 16, wherein the load store unit is configurable to schedule the load instruction for execution concurrently with execution of the operation for providing the data to the entry.

20. The apparatus of claim 16, wherein the apparatus is configurable to replay the load instruction if the entry in the store queue has not received the data before the load instruction executes.

21. The apparatus of claim 15, wherein the apparatus is configurable to determine, prior to translation of the virtual address of the store instruction to a physical address, that the virtual address associated with the store instruction matches a virtual address associated with the load instruction.

22. A non-transitory computer readable media including instructions that when executed can configure a manufacturing, process used to manufacture a semiconductor device comprising:
a load queue configured to store a load instruction;
a store queue comprising entries for storing information associated with a store instruction, wherein the entries comprise storage for data to be written to a physical address by the store instruction, and wherein the entries are allocated in response to the store instruction being, dispatched and prior to receiving a translation of a virtual address associated with the store instruction to the physical address; and
wherein the store queue is configured to, in response to an identification that the load instruction is associated with the store instruction, send a wake-up signal from the store queue to the load queue to wake-up the load instruction, wherein the store queue is configured to send the wake-up signal after allocating the entry in the store queue and prior to the entry receiving the data.

23. The computer readable media set forth in claim 22, wherein the semiconductor device further comprises a load store unit comprising the store queue and the load queue, and wherein the load store unit is configurable to identify that the load instruction is associated with the store instruction by determining that an address associated with the store instruction matches an address associated with the load instruction in the load queue.

* * * * *